(12) United States Patent
Hudson

(10) Patent No.: US 6,491,156 B1
(45) Date of Patent: Dec. 10, 2002

(54) FLUID PLENUM CONVEYOR TROUGH AND METHOD FOR FABRICATING AND JOINING THE SAME

(75) Inventor: Thomas Clinton Hudson, Bessemer, AL (US)

(73) Assignee: Hudco Industial Products, Inc., Bessemer, AL (US)

(*) Notice: Subject to any disclaimer, the term of this patent is extended or adjusted under 35 U.S.C. 154(b) by 55 days.

(21) Appl. No.: 09/660,159

(22) Filed: Sep. 12, 2000

(51) Int. Cl.[7] ............................................. B65G 15/60
(52) U.S. Cl. ...................... 198/811; 198/837; 198/838
(58) Field of Search ............................... 198/811, 841, 198/838, 839, 837, 818, 820, 821, 822

(56) References Cited

U.S. PATENT DOCUMENTS

| | | | | |
|---|---|---|---|---|
| 3,627,111 A | * | 12/1971 | Hillinger | 198/184 |
| 3,734,271 A | * | 5/1973 | Dolgolenko et al. | 198/184 |
| 3,889,802 A | | 6/1975 | Jonkers | |
| 4,185,736 A | * | 1/1980 | Jonkers | 198/811 |
| 4,289,230 A | * | 9/1981 | McGee | 198/811 |
| 4,984,681 A | * | 1/1991 | Jonkers | 198/811 |
| 5,396,071 A | * | 3/1995 | Atwell et al. | 250/358.1 |
| 5,829,577 A | * | 11/1998 | Grisley | 198/811 |
| 6,062,377 A | * | 5/2000 | Mensch | 198/811 |
| 6,170,644 B1 | * | 1/2001 | Nakaegawa et al. | 198/811 |

* cited by examiner

Primary Examiner—Donald P. Walsh
Assistant Examiner—Rashmi Sharma
(74) Attorney, Agent, or Firm—Smith, Gambrell & Russell, LLP

(57) ABSTRACT

A fluid plenum trough conveyor support that provides a near frictionless fluid film bearing to support a conveyor belt. The apparatus of the present invention may be used as a discrete conveyor belt support element. The discrete elements formed by the method of the present invention may also be sealingly joined to form a continuous trough conveyor path for a conveyor system. An improved particulate collection system is provided at termination points of the conveyor system for eliminating particulate emissions as the bulk materials transported by the conveyor are unloaded or transferred to receiving points.

28 Claims, 5 Drawing Sheets

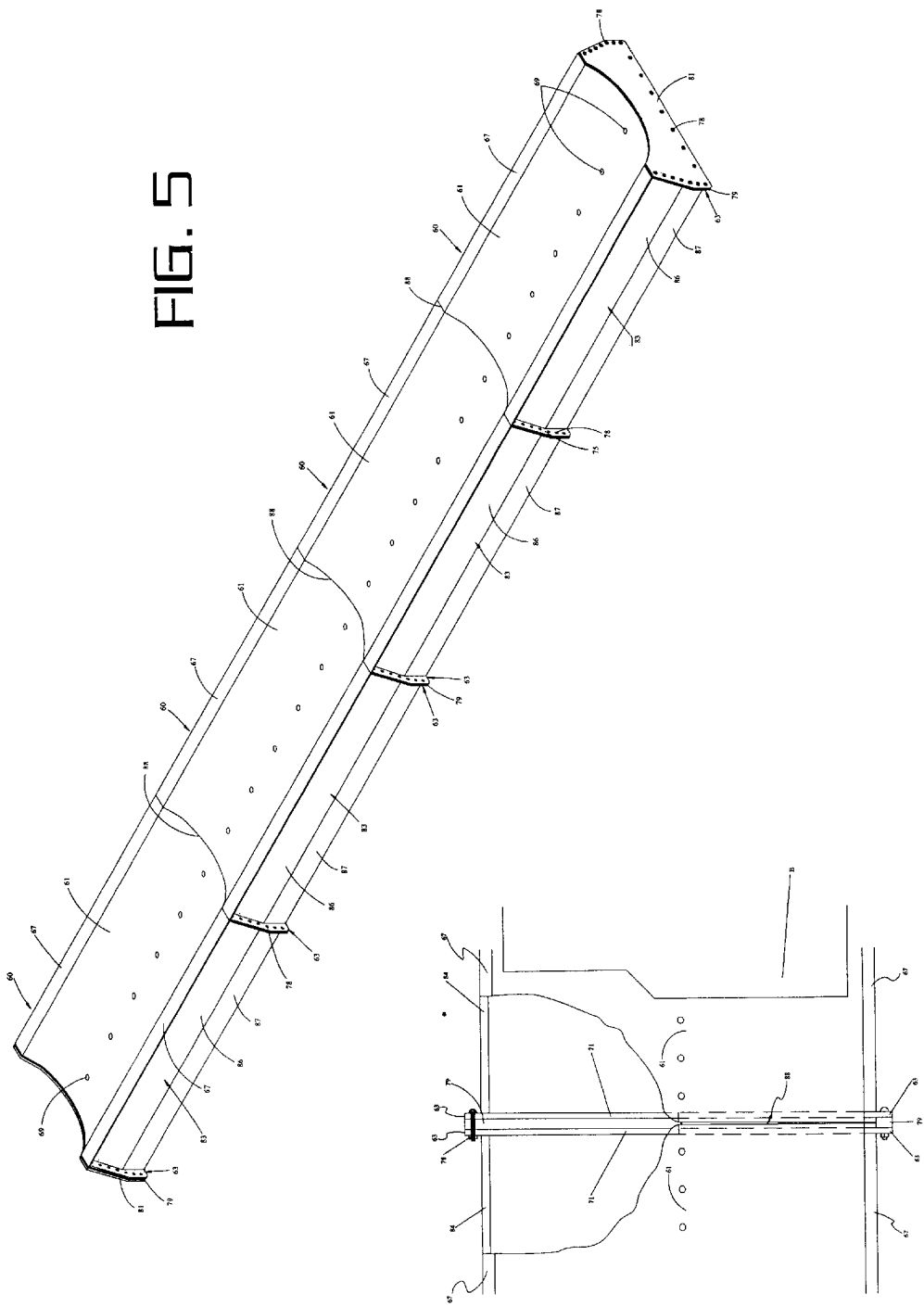

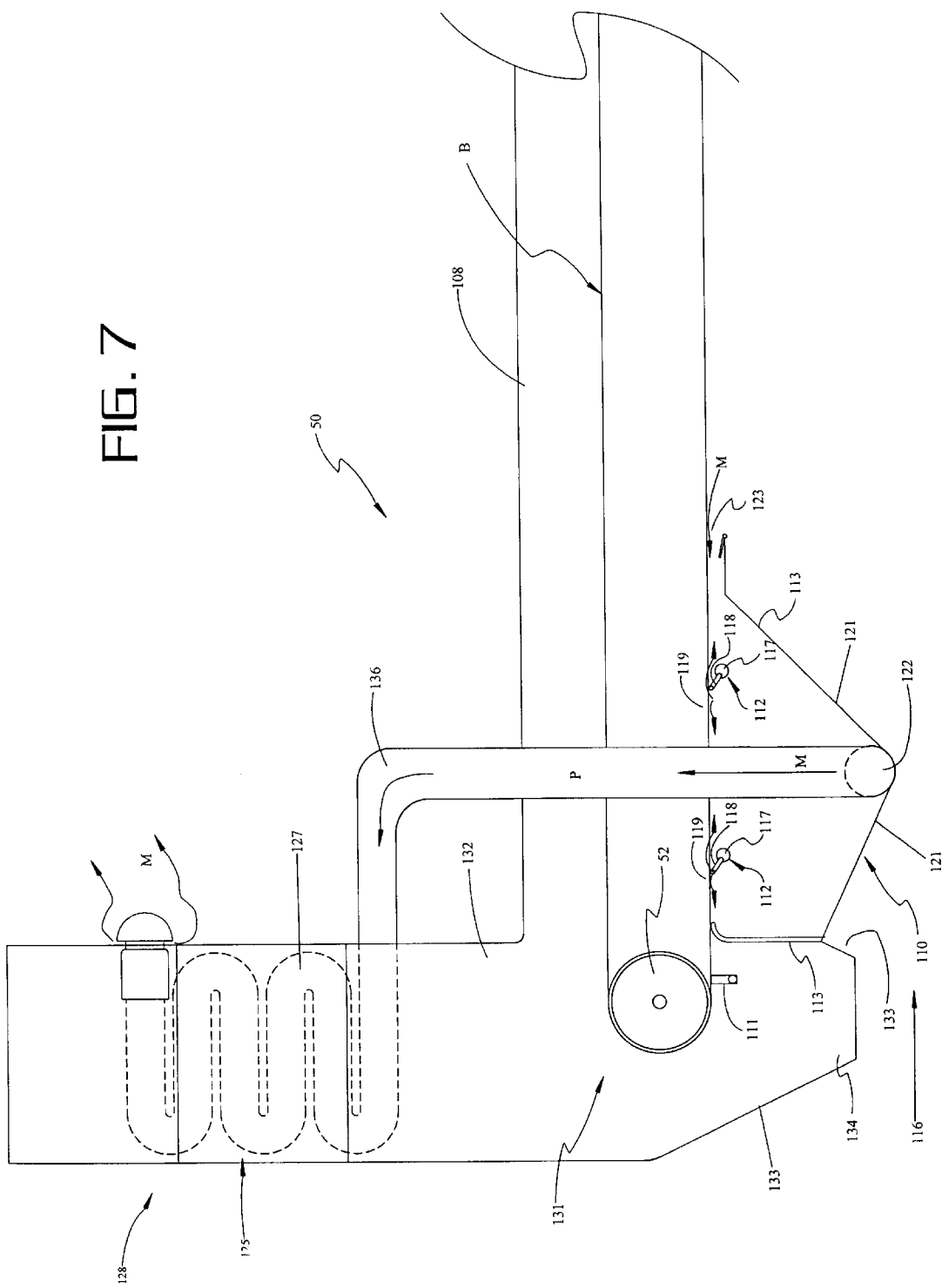

FLUID PLENUM CONVEYOR TROUGH AND METHOD FOR FABRICATING AND JOINING THE SAME

FIELD OF THE INVENTION

The present invention relates to an apparatus for supporting a conveyor belt. More specifically, the apparatus of the present invention relates to a fluid plenum trough conveyor support that provides a near frictionless fluid film bearing to support a conveyor belt. The apparatus of the present invention may be used as a discrete conveyor belt support element. The discrete elements formed by the method of the present invention may also be sealingly joined to form a continuous trough conveyor path for a conveyor system. An improved particulate collection system is provided at termination points of the conveyor system for eliminating particulate emissions as the bulk materials transported by the conveyor are unloaded or transferred to receiving points.

BACKGROUND OF THE INVENTION

Conveyor belt systems have been known and used in many industries for many years. Many of these systems utilize a continuous loop belt to transport bulk materials from one point to another. Traditionally the belt is supported by idler rollers, or troughing rollers which define a conveyor path. The drive means that translate the belt along the conveyor path must be capable of moving the weight of the materials as well as overcoming the frictional forces developed between the belt and the above described support means.

The conveyor systems described above have many drawbacks. First, each of the support rollers is subject to wear and mechanical failure. These failures can damage a belt or cause premature wear of the belt. Second, the rollers require routine maintenance. Often the location of these rollers within the conveyor system will pose significant hazards to maintenance personnel assigned to service these components. Other times, the location of these components will merely be an inconvenience. In either case these difficulties can lead to significant delays or equipment downtime while maintenance personnel service the equipment. Finally, each roller introduces a component of friction into the system, which must be overcome by the belt drive mechanism. These frictional components tend to increase as the rollers and their associated bearings wear, requiring additional energy consumption by the drive mechanism. In turn, the belt drive mechanism is subjected to additional wear, potentially causing premature mechanical failure.

Fluid plenum conveyor belt support elements have been introduced to overcome these limitations. They function by the introduction of a pressurized fluid source between the belt and a trough formed in the plenum to contain and guide the belt. The pressurized fluid forms a fluid film layer between the trough and the conveyor belt. The fluid film supports the weight of the belt and the materials transported thereon, while providing a near frictionless bearing surface between the belt and the trough. This concept provides distinct improvements over earlier roller methods. First, maintenance of the bearings is virtually eliminated by the elimination of the moving components of the earlier roller systems. Second, the fluid film bearing significantly reduces the amount of friction between the belt and supporting conveyor path. Finally, the reduction of frictional forces encountered by the belt permits operation of the conveyor drive mechanism at reduced power levels resulting in reduced energy costs and reduced wear and tear on the belt drive mechanism.

While fluid plenum conveyor systems have many advantages over troughing roller systems, fluid plenum systems in the art demonstrate significant inefficiencies. First, the shape of these fluid plenum troughs inhibits efficient fluid film layer propagation. Second, the fabrication techniques used to form the troughs introduce surface irregularities which become more pronounced in response to operational and environmental factors. These surface irregularities further inhibit efficient propagation of the fluid film layer. Third, the prior art methods used to join discrete trough elements to form a continuous fluid plenum conveyor system introduce further surface irregularities at the joint between each element. Moreover, these junctions do not sealingly join trough elements, permitting the inefficient escape of pressurized fluid from the plenum. Fourth, the fluid plenum troughs of the prior art demonstrate the undesired characteristic of belt float, wherein an unloaded portion of the conveyor belt lifts uncontrollably from the trough. Finally, in applications that transport bulk materials containing or developing significant amounts of particulate matter, the pressurized fluid used to produce the fluid film surface can release the particulate into the environment, creating an environmental hazard.

Prior art versions of fluid plenum conveyors employ a cross-sectional trough shape consisting of a central radius symmetrically extending upward from each side of a vertical centerline. When the central radius reaches a desired angle, the trough is further extended with straight sides extending upward from a point of tangency with the central curve to create a trough of the desired cross section. The intent of the prior art designs was to create a trough with the same cross-sectional profile as prior art troughing rollers in accordance with Conveyor Equipment Manufactures Association, (CEMA) standards. It was thought that a fluid film conveyor trough of the described profile would best permit the intermittent use of standard CEMA troughing rollers in cooperation with fluid plenum troughs to form a continuous conveyor path. While this design more accurately replicates the conventional roller profile, it is not the optimum shape to create a supporting fluid film. Uniform contact of the belt with the trough surface is critical to allow the pressurized fluid to equally react against the entire surface of the belt. The flat tangential sections of the prior art design prevent uniform contact of the belt with trough surface. As a result, fluid flow separation occurring near the boundary of the tangentially flat portions and the curved portion disrupting the propagation of the fluid film layer.

Prior art troughs with tangential sides also exhibit surface irregularities which become more pronounced in response to operational and environmental factors. The surface irregularities primarily manifest themselves along the length of the tangential portions of the trough, and are defined by convex and concave portions interspersed throughout the trough surface. However, the techniques used to join the flat tangential portions to the central radius portion can also distort the surface of the central radius portion. The surface variations cause corresponding variations in the fluid pressure between these portions of the trough and the belt. The concave areas impose a lower pressure against the belt due to the belt bridging across the concave areas. The increased fluid flow across the concave portions further disrupts the propagation of the fluid film layer. Conversely, the convex areas impose higher pressures against the belt. When the pressure between the belt and the convex portions of the trough exceeds the pressure of the fluid film, the belt will come into frictional contact with the trough. In response to operational and environmental stresses, these surface irregularities become more pronounced, further reducing the efficiency of the fluid plenum conveyor system. In an application using air as the supporting fluid, a relatively low operating pressure of 1. PSI is typical. This seemingly low pressure exerts substantial total pressure within the plenum. For example: a trough supporting a 54" wide conveyor belt has over 15,000. pounds of upward lift on a typical 20. foot long section. When combined with the effects of thermal expansion, these pressures will further distort the surface irregularities in the trough, seriously degrading the efficiency of the system. The resultant effect of all these inefficiencies is an increased power demand from the conveyor drive and blower mechanisms with corresponding wear on the belt, trough, and drive and blower mechanisms.

The prior art methods used to join discrete trough elements to form a continuous fluid plenum conveyor system introduce additional surface irregularities at the joints between each element. Moreover, these joints do not adequately seal joined trough elements, permitting the inefficient escape of pressurized fluid from the plenum. Typically, fluid plenum troughs in the art are joined by a tongue and groove arrangement, wherein a tongue is fixed to the underside of the plenum trough of one member and a groove is fixed to the underside of the plenum trough of a second member. The engagement of the tongue into the groove provides alignment and joining of the trough elements. The tongue and grooves are formed to parallel the contours of the trough elements. By this arrangement, the joint is unable to provide needed support to resist the perpendicular loads imposed on the trough. As a result, it is common to find troughs connected by this technique with an added surface irregularity along the joint. This irregularity will experience further distortion in response to the operational and environmental stresses discussed above. Furthermore, troughs joined by this technique do not include a sealing connection between the trough elements. As a result, considerable energy is lost in a long conveyor system, with even small amounts of fluid leaks at each plenum connection.

The characteristic "belt float" is another common problem with fluid plenum troughs in the art. The absence of a load to overcome the belt tension, causes the belt to span the center portion of the trough in the same manner as a belt encountering a convex surface irregularity described above. As the belt spans the central radius it lifts uncontrollably from the surface of the trough. In applications employing covers over the conveyor trough, the uncontrolled lifting of the belt can cause damage to the covers and the belt. Moreover, as the belt separates from the surface, fluid flow becomes less restricted, which if left uncorrected, will result in degraded fluid film layer performance over loaded portions of the belt.

The introduction of fluid plenum systems for use in conveyor operations has also created a potential environmental hazard. In operations where significant quantities of particulate products are transported or are created during the transport of bulk products, the pressurized fluid required to develop the fluid film layer tends to entrain the particulate, thereby contaminating the fluid. As a result, control measures are needed to prevent their release to the environment or causing damage to the fluid pressurizing system.

Consequently, there exists a need for an improved fluid plenum trough design that enhances the propagation and maintenance of the induced fluid film surface between the trough and the conveyor belt.

There is also a need to improve the methods of manufacture for the fluid plenum elements to reduce the occurrence of surface irregularities in the trough.

Furthermore, an improved method of joining fluid plenum elements is required to enhance the efficiency of the conveyor system to reduce drive mechanism and fluid pressurizing system loads.

Finally, there is a need to make fluid plenum conveyor systems more environmentally sound.

SUMMARY OF THE INVENTION

It is a first object of the present invention to provide a fluid plenum conveyor trough having improved fluid film propagation properties. This is achieved in the present invention by a preferred trough shape comprising a continuous radius extending symmetrically upward from each side of a vertical centerline, the radius created by a curve that would intersect at the midpoint of a standard CEMA roller. The point intersected by the vertical centerline should also be slightly lower than the top edge of the bottom roller of a standard CEMA roller trough. Selection of the radius, as defined above, permits use of a CEMA roller in series with the plenum trough without belt interference at either the receiving or transmitting ends of the plenum trough. By eliminating the flat tangential portions of the prior art trough profile, consistent belt pressure across the trough profile is achieved resulting in more efficient fluid film propagation.

Second and third objects of the invention, directed towards reducing the surface irregularities of the trough and facilitating the manufacturing process, are achieved by selection of the constant radius profile and maintaining the radius throughout the manufacturing process. A continuous radius trough is easily fabricated by either cutting a section pipe having the desired radius or forming a flat material to the desired radius. The continuous radius of the trough section is maintained by use of a precision alignment fixture temporarily securing and aligning a corresponding radius of arcuate end plates during their attachment to opposite ends of the trough section. After attachment of the mating flanges, the plenum is formed around the trough section such that the plenum conforms to the trough. The plenum optionally includes at least one arcuate support gusset enclosed therein, supporting the trough along its length and strengthening the plenum against torsional loads.

A fourth object of the present invention, directed to improve the joining of plenum elements, is achieved by the precision alignment of the arcuate mating flanges, as described above. Since each plenum element is identically formed, joining successive plenum elements in near perfect alignment is easily achieved. Adjoining mating flanges are joined by securing bolts, rivets or other suitable attachment means, received in aligned holes interspersed throughout the periphery of the flanges. To achieve a fluid tight seal, a gasket is compressed between the mating flanges by securement of the attachment means.

A fifth object of the present invention, directed to reducing the deleterious effects of belt float, is achieved by the attachment of tapered wedges to the constant radius portion of the trough. As an unloaded belt portion begins to lift from the trough surface, the edges of the belt encounter the tapered wedges. The wedges controllably lift the belt from the trough surface, facilitating purging of excess fluid from beneath the belt. The purging of excess pressurized fluid reduces the lifting energy imparted to the belt thereby preventing uncontrolled floating of the belt.

A final object of the present invention is directed towards controlling particulate release into the environment or contamination of the fluid pressurization system. This is achieved by the use of a fluid knife to clean particulate matter from the belt shortly after it has deposited the transported product to the delivery point. The fluid knife impinges the surface of the belt to dislodge the particulate matter and entrain it with the fluid and a larger mass fluid volume flow. The entrained particulate is then ducted to a standard filtration system, such as a bag house as such devices are commonly known by in the art.

BRIEF DESCRIPTION OF THE DRAWINGS

FIG. 5 is a perspective view of fluid plenum trough elements joined in series;

FIG. 6 is a plan view of a joint between fluid plenum trough elements; and

FIG. 7 is a side view of a conveyor system with a dust collection and disposal apparatus.

DESCRIPTION OF THE PREFERRED EMBODIMENT

Figure 1:
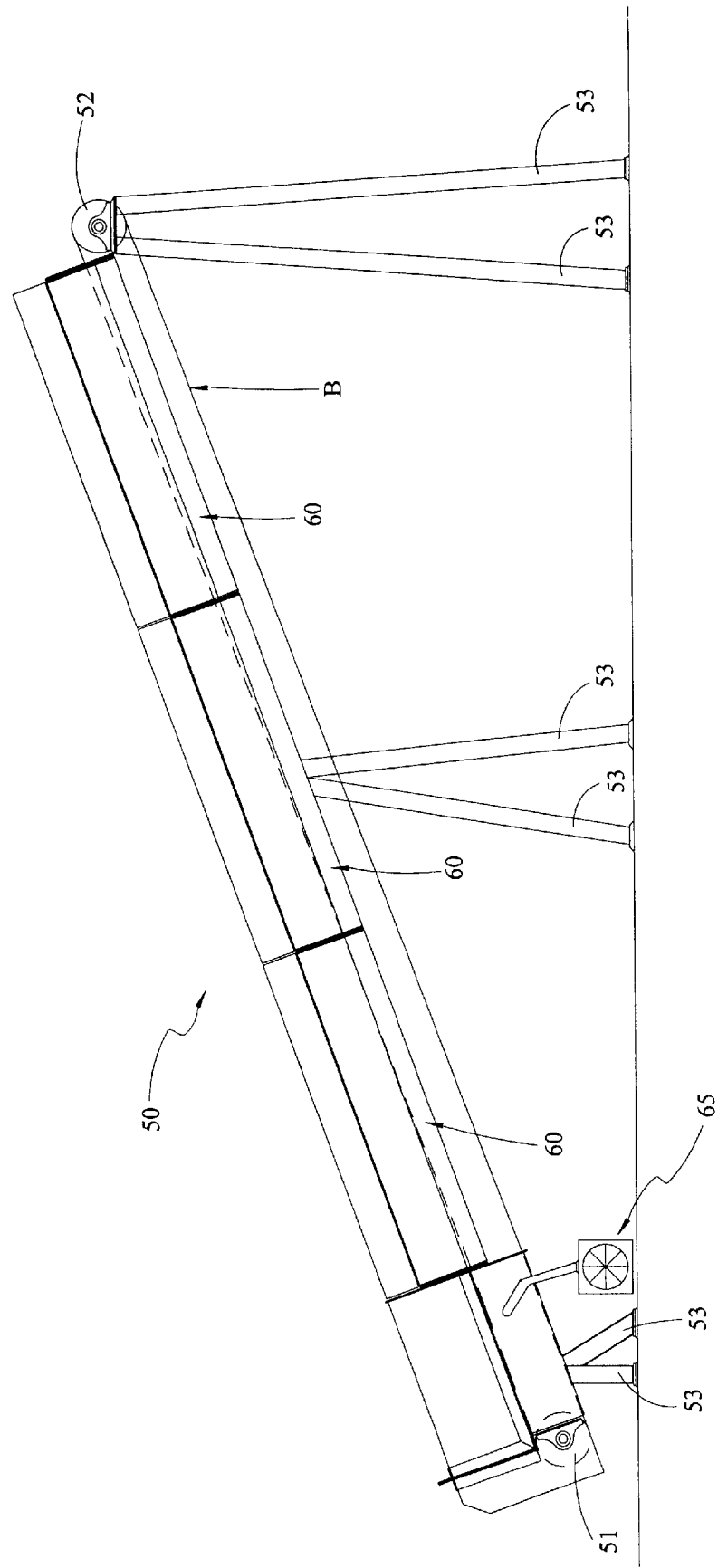
FIG. 1 is a side view of a fluid plenum trough conveyor system.
Figure 2:
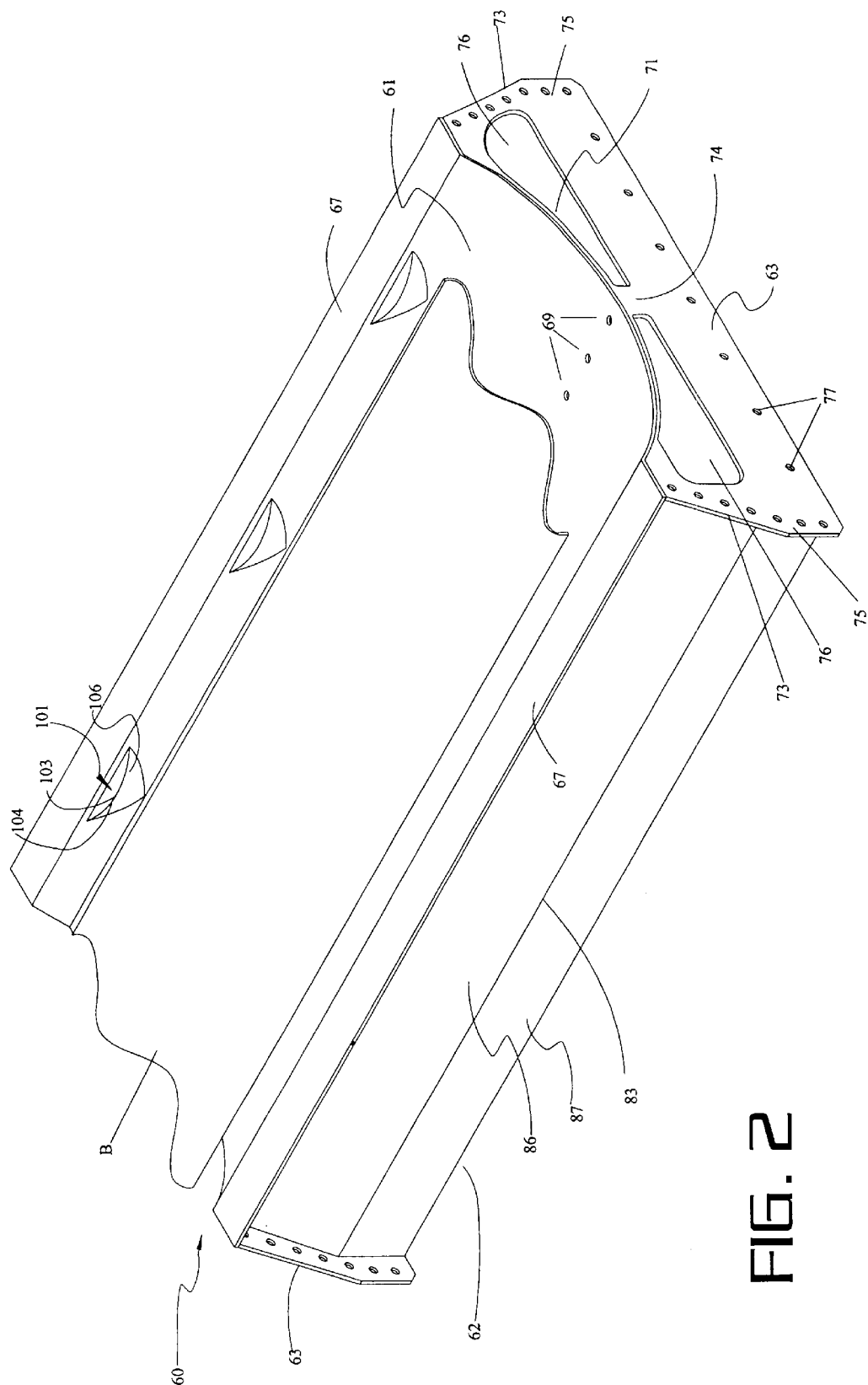
FIG. 2 is a perspective view of a fluid plenum trough element.

Referring to the drawings for a clearer understanding of the invention, it may be seen that FIG. 1 shows a conveyor system 50 comprised of a series of fluid plenum trough elements 60, the conveyor system 50 having a driven roller 51 and a return roller 52, with an endless belt B entrained about driven roller 51 and return roller 52. Support members 53 hold the fluid plenum conveyor path at a desired delivery angle and support the conveyor system. A pressurized fluid source 65 in fluid communication with plenum elements 60 provides the fluid for generating a substantially frictionless fluid film bearing surface between belt B and trough elements 60.

Figure 3:
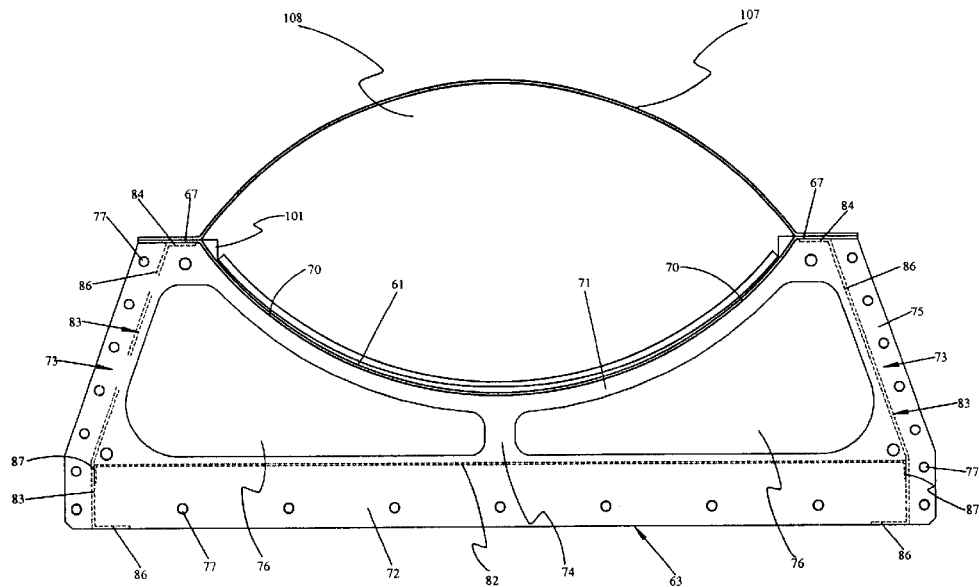
FIG. 3 is an end view of a fluid plenum trough element with a discrete element housing.
Figure 4:
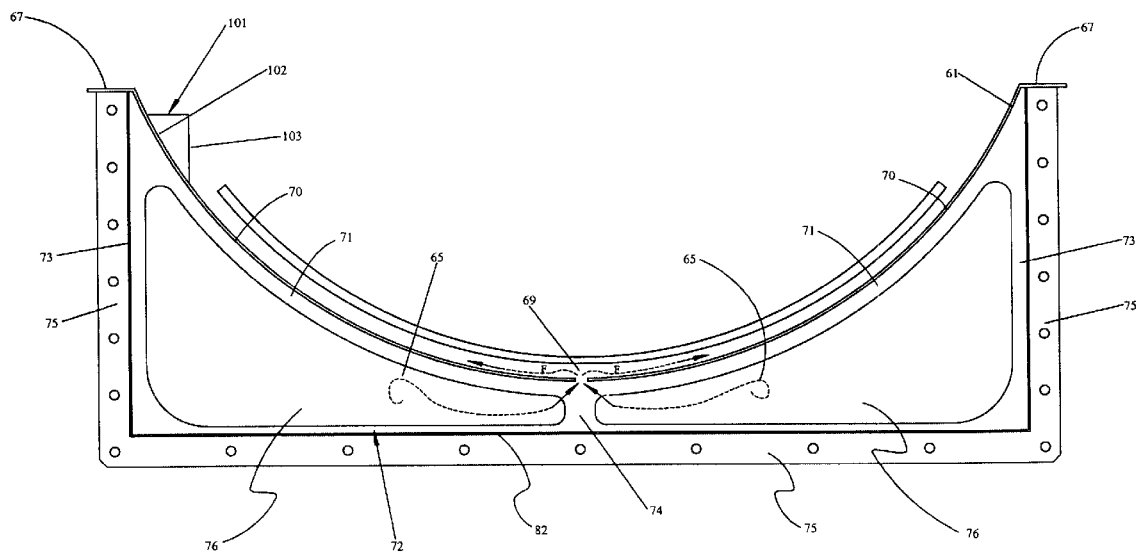
FIG. 4 is an end view of a fluid plenum trough element with a unitary housing.

As is best seen in FIGS. 2 through 6, each fluid plenum trough element 60 comprises a longitudinally extending trough section 61 supporting a portion of endless belt B, a housing 62, a pair of arcuate end plates 63, and a plurality of orifices 69 arrayed along the longitudinal length of trough section 61. A critical aspect of the invention is that trough section 61 have an arcuate, constant radius, transverse dimension extending symmetrically upward from each side of a vertical centerline of said trough defining a constant radius section 66. Furthermore, endless belt B must be supported above the trough surface 64 within the boundaries of constant radius section 66. By supporting endless belt B within the boundaries of constant radius section 66, the fluid plenum trough element 60 of the present invention is able to achieve optimal propagation of a fluid film surface F between endless belt B and trough surface 64. As is best seen in FIG. 4, fluid film surface F is formed by communication of pressurized fluid 65 through orifices 69. First and second outwardly extending flange sections 67 provide constant radius section 66 additional support and provide a suitable mating surface for alignment and joining of trough section 61 to end plates 63 and housing 62.

In the preferred embodiment of the invention, trough element 60 is connectable to a series of subsequent trough elements 60 to form a continuous fluid plenum trough conveyor path, as may be seen in FIG. 5. Arcuate end plates 63 are precision formed to be joined to trough section 61, end plates 63 supporting and maintaining the constant radius transverse dimension of trough section 61 during fabrication of the trough element 60 and operational employment in a conveyor system. Additionally, end plates 63 provide means for sealingly joining subsequent trough elements 60, and provide means for communicating pressurized fluid 65 between subsequent elements 60.

Arcuate end plates 63 are comprised of an upper arcuate edge 71 precisely matching the constant radius, transverse dimension of trough section 61, a base element 72, and vertical support elements 73 extending upwardly from base element 72 and joining opposing ends of upper arcuate edge 71. A central rib 74, joining midpoints of arcuate edge 71 and base element 72, provides additional structural support to end plate 63. Most importantly, central rib 74 prevents deformation of the constant radius, transverse dimension of trough section 61 in response to fluid pressure developed within the plenum during operation.

Arcuate edge 71, base element 72, vertical support elements 73, and central rib 74 define a pair of contoured low restriction fluid passages 76 which provide fluid communication between connected plenum trough elements. Vertical support elements 73 and base element 72 have extensions 75, extending outwardly beyond outer walls of housing 62. A plurality of holes 77 disposed along extensions 75 receive attachment means 78, such as bolts, pins, or rivets, for joining subsequent elements 60. In the preferred embodiment, a gasket 79 or similar sealing means is interposed between end plates 63 and is sealingly compressed by securement of attachment means 78 joining subsequent trough elements 60.

To obtain an optimum seal and prevent surface irregularities along a seam 88, as seen in FIGS. 5 & 6, between trough elements 60, upper arcuate edge 71 is offset a predetermined dimension inwardly from ends of trough section 61, and is sealingly attached to a lower surface 70 of trough section 61. In the preferred embodiment, the offset dimension should be less than or equal to the thickness of end plate 63.

In the preferred embodiment of the invention, wherein subsequent plenum elements 60 are sealingly joined to form a continuous fluid plenum path, low restriction fluid passages 76 must be closed at end points of conveyor path to seal the plenum conveyor and contain pressurized fluid 65 therein. In this instance, a sealing plate 81 may be secured to end plate 63 in the same manner as subsequent end plates 63, described above. Similarly, in applications where a single fluid plenum trough element 60 is used to replace a section of troughing rollers, fluid passages 76 may be sealed by securement of sealing plates 81 as described above. Alternatively, a single trough element 63 may be formed with sealed ends in the first instance, or, in the case of a trough element 60 located at the end of a conveyor path, with a single sealed end.

Housing 62 may be a unitary element as depicted in FIG. 3 or formed from discrete elements, as depicted in FIG. 4. In either case housing 62 comprises a bottom panel 82, and first and second opposed side panels 83. Trough elements 60 comprised of a unitary housing 62 are preferable in applications where trough elements 60 are retrofitted to an existing conveyor support system. Trough elements 60 fabricated with discrete housing elements are preferred for applications requiring greater structural strength.

First and second side panels 83 may also comprise an upper inwardly extending flange member 84, an intermediate section 86, and a lower vertical portion 87. Upper inwardly extending flange member 84 extends substantially horizontal along an upper longitudinal length of side panels 83 and parallel trough section flange members 67. Bottom panel 82 is disposed between ends of side panel lower vertical portions 87. Trough section 61 is supported by housing 62 at the interface between lower surfaces of trough section flanges 67, and either side panel edge 85 or upper surfaces of inwardly extending flange members 84.

In an embodiment wherein housing 62 is formed from discrete elements, first and second side panels 83 may also have a lower inwardly extending flange 89. Bottom panel 82 may also have a pair of vertical flanges 91 extending downwardly along opposing lengths of bottom panel 82. Vertical flanges 91 mate with side panel lower vertical portions 87, permitting vertical adjustment of bottom panel 82 relative end plates 63. Bottom panel 82 is then sealingly joined between side panels 83, defining housing 62.

With longer length trough elements 60, added support and torsional strength is provided by installing at least one internal support gusset 92 in housing 62. In the preferred embodiment, internal support gussets 92 comprise an upper arcuate edge 93 precisely matching the constant radius, transverse dimension of trough section 61, a base element 94, vertical support elements 96 extending upwardly from base element 94 and joining opposing ends of upper arcuate edge 93. A central rib 97, joining midpoints of arcuate edge 93 and base element 94, provides additional structural support to gussets 92. As with central rib 67 of end plates 63, support gusset central rib 97 prevents distortion of the constant radius, transverse dimension of trough section 61 due to the force of pressurized fluid 65 within the plenum trough sections 60. Arcuate edge 93, base element 94, vertical support elements 96, and central rib 97 define a pair of contoured low restriction fluid passages 98 which provide fluid communication throughout the length of plenum trough element 60. Internal support gussets 92 are attached to internal walls of housing 62.

An optional belt float regulator wedge 101 may be attached to outer edges of trough section 61 at a point slightly higher than lateral edges of belt B. Belt float regulator wedge 101 is comprised of an inner face 102, an outer face 103, and a tapered leading edge 104. Inner face 102 is curved to match the constant radius of trough section 61. Outer face 103 tapers from a center thickness of wedge 101 to near zero thickness at its bottom end. Leading edge 104 tapers from a center thickness of wedge 101 to near zero thickness in a direction upstream a translational path of belt B. Leading edge 104 and outer face 103 cooperate to slidably engage and lift belt B at a controlled rate permitting excess pressurized fluid 65 to escape from between belt B and trough surface 64 to thereby eliminate uncontrolled lifting of belt B caused by excess pressurized fluid 65. In a preferred embodiment, belt float regulating wedge 101 has a trailing tapered edge 106 tapering from a center thickness of wedge 101 to near zero thickness at a point downstream the translational path of belt B. Trailing tapered edge 106 cooperates with outer face 103 in the same manner as previously described in situations when conveyor system 50 is selectively operated in a reverse direction.

According to the present invention, an optional cover 107 may be installed to protect delivered product P from environmental factors, prevent spillage of product P, or to contain particulate P discharge from delivered product P. In the preferred embodiment, cover 107 is convex and attaches to upper surfaces of trough first and second flanges 67. Ideally, cover 107 is sealingly attached to trough elements 60 defining a product delivery chamber 108.

In transporting bulk product P on a conveyor system 50, it is desirable to remove excess product P which has become lodged on belt B. It is also desirable to clean debris and particulate P from the product carrying surface of belt B to prevent their accumulation in vital components of conveyor system 50. The apparatus described is primarily suited for use with fluid plenum conveyor systems. However, it will be realized that the system described herein may be readily adapted to traditional roller trough conveyor systems. The belt cleaner 110 of the present invention comprises a belt scraper 111, at least one fluid knife 112, a fluid knife enclosure 113, and a discharge duct 114. Ideally, belt cleaner 110 is positioned slightly downstream return roller 52 near a product discharge point 131 of a conveyor system 50 and on a return path of belt B. Belt scrapers 111 are well known in the art and may be comprised of a flat rigid or semi-rigid plate aligned perpendicular to a longitudinal length of belt B at a position between fluid knife enclosure 113, and return roller 52. Preferably belt scraper 111 is located at the point of belt tangency with return roller 52. Belt scraper 111 is positioned in sliding scraping contact with the product carrying surface of belt B, belt scraper 111 dislodging larger portions of product which have become lodged on belt surface B. By selecting a position close to product discharge point 131, product P dislodged by belt scraper 111 can be delivered to a product receiving point 116 along with the bulk product P delivered by conveyor system 50.

Fluid knife 112 is comprised of a manifold 117 and a plurality of fluid jets 118 in fluid communication with manifold 117. Fluid jets 118 are aligned to project a high pressure fluid 119, communicated through manifold 117, against the product carrying surface of belt B. Pressurized fluid 119 impinges belt B and dislodges residual particulate P from belt B. The dislodged particulate P is entrained with pressurized fluid 119 and is contained within fluid knife enclosure 113. Fluid knife enclosure 113 may be comprised of a unitary panel, such as a cylindrical enclosure, or a plurality of panels, such as a box-like enclosure, panels 121 tapering downwardly and inwardly to join at a common origin. A discharge duct 122 is positioned near the common origin, where the particulate P and entraining fluid may be collected for disposal.

In an application where it is preferable to use a gaseous fluid with fluid knife 113, a gaseous fluid mass flow inlet 123 is located on a downstream edge of fluid knife enclosure 113. Inlet 123 receives a mass gaseous fluid flow M, drawn by a suction source connected to discharge duct 122. The mass gaseous fluid flow volume should be substantially higher than a gaseous fluid volume released by fluid knife 112. The mass gaseous fluid flow M entrains particulate P where they are drawn out discharge duct 122 by the suction source.

In the preferred embodiment of the invention, a particulate collection and disposal apparatus 125 is operatively connected to discharge duct 122, and is positioned above conveyor product discharge point 131. The apparatus comprising a particulate collector 127 and a conveyor product discharge point enclosure 132. Particulate collector 127 may be any volumetric fluid filtration device wherein particulate P is kinetically separated from the fluid flow by passing the fluid M and entrained particulate P through a series of baffles or in a cyclonic manner. Such devices are well known in the art and are generally referred to, along with their enclosure and associated equipment, as a baghouse 129. In the preferred embodiment, baghouse 129 is mounted on top of a product discharge point enclosure 132. Discharge point enclosure 132 sealingly encloses and is in fluid communication with product discharge point 131, product delivery chamber 108, and fluid knife enclosure 113. As with fluid knife enclosure 113, discharge point enclosure 132 may be comprised of a unitary panel, such as a cylindrical enclosure, or a plurality of panels, as in a box like enclosure. Discharge point enclosure walls 133 taper downwardly and inwardly to form a chute 134, which is positioned above and empties into product receiving point 116.

Particulate P released during conveyor and fluid knife 112 operation is entrained by mass fluid flow M, and is drawn through product delivery chamber 108 and fluid knife enclosure 113, through discharge duct 114, and communication means, such as a duct 136, to baghouse 128. Particulate collector 127 separates particulate P from mass fluid flow M. The collected particulate product is discharged from the bottom of bag house 128 and joins with delivered bulk product P at product receiving point 116. Clean filtered mass fluid flow M is released from baghouse 128 to the environment.

Method of Manufacturing a Plenum Trough Element

A further object of the present invention relates to a method of fabricating a fluid plenum trough element 60 for either joining to similar elements to form a continuous fluid plenum conveyor path, or for replacing one or more troughing roller assemblies in a standard conveyor system 50. A preliminary step in all conveyor system manufacturing will involve identifying the required operational capabilities of the system. Design factors such as the type of product P, the desired product P delivery rate, the distances, both horizontal and vertical, product P must be transported, and whether the conveyor system must be capable of bi-directional conveyance are among the relevant considerations affecting the design and selection of trough characteristics. Additional design factors may be found by referencing standards published by the Conveyor Equipment Manufactures Association, CEMA.

According to the objects of the present invention, the fluid plenum trough element 60 must be formed to prevent introducing trough surface irregularities during manufacture, and to provide a structurally sound fluid plenum trough element 60 that will not develop surface irregularities during subsequent material conveying operations. Accordingly, the first step in the method of the present invention is the formation of a trough section 61 that is free of surface irregularities. The preferred method of obtaining a trough free of surface defects is by selecting a cylindrical pipe having a radius corresponding to the desired constant radius, transverse dimension of finished trough element 60. The pipe is first cut about its circumference to a length corresponding to a desired length of fluid plenum trough element 60. A first longitudinal cut is made parallel a central axis of the pipe. This cut extends through the length of the pipe. A second longitudinal cut is made at a point on an outer circumference of the pipe corresponding to a desired arc length of finished trough section 60. This cut is made parallel the first longitudinal cut and parallel the central axis of the pipe. Alternatively, those skilled in the art will realize that a sheet of material may also be bent to the desired constant radius, transverse dimension of the trough section 60.

As maintenance of the constant radius, transverse dimension is a critical aspect of the present invention, the succeeding steps are directed towards conforming the remaining structural elements to the dimensions of the constant radius trough section 61 and providing additional support to constant radius trough section 61. The first means for supporting the trough section 61 is provided during the second step of the invention. In the second step of the present method, first and second flange members 67, 68 are formed along the longitudinal length of trough section 61, the flange members 67, 68 extending laterally and substantially horizontally from end points of the constant radius section along the lengths thereof. In the preferred method, the flanges are formed by precisely bending a portion of the constant radius trough section 61 formed in the first step. When utilizing this method, the arc length of the section cut in the previous step must be increased accordingly. Alternatively, the flange members 67, 68 may be formed by sealingly attaching linearly extending flat plates along the outer edges of trough section 61. The plates may be attached by welding or similar means suitable for the materials chosen for the trough element and flanges.

The next step involves precisely and sealingly attaching at least one arcuate end plate 63 to trough section 61. According to the method contemplated by the present invention, trough section 61 is temporarily affixed to a holding fixture that maintains the constant radius, transverse dimension of trough section 61. In similar fashion, end plate 63 is temporarily affixed to the holding fixture, end plate 63 having indexing means, which receive a corresponding guide means on the holding fixture. As may be seen in FIGS. 3 & 4, upper arcuate edge 71 of end plate 63 precisely matches trough section lower surface 70. A critical object of the present invention, eliminating surface irregularities at seams 88 of adjoining trough elements, is achieved by the precise alignment of end plate 63 with respect to trough section 61. As is best seen in FIG. 6, end plate 63 is aligned parallel an end of trough section 61. End plate 63 is inwardly offset a predetermined distance from the trough section end. Ideally, this dimension should be no greater than a thickness of end plate 63. However, as should be apparent, minor variations exceeding this dimension will not significantly detract from the invention contemplated. Preferably, end plate 63 is further aligned so that it is perpendicular to trough section lower surface 70. Deviations from this alignment may be made where subsequent trough elements need to be joined in a non-linear arrangement, as may be required to impart a curvature into a continuous trough system. Once end plate 63 is aligned relative trough section 61, locking means on the fixture are actuated, temporarily fixing the pieces in perfect alignment. End plate 63 is then sealingly joined to trough section 61 by welding, bolting, riveting, or similar means appropriate for the materials selected. The fixture is then unlocked and the joined pieces are removed from the fixture. The step can then be repeated to join a second end plate 63 to the opposite end of trough section 61.

Housing 62 is constructed to conform to the joined trough section 61 and end plates 63 without exerting deforming forces thereon. The length of housing 62 corresponds with a known distance between inner faces of end plates 63. Housing 62 may be formed as a unitary element or may be comprised of a plurality of elements formed and joined to form housing 62. In either case, first and second side panels 83 are formed by deforming a linearly extending flat plate to from an upper inwardly extending flange member 84 and a lower vertical portion 87. An intermediate section 86 is disposed between flange member 84 and lower vertical portion 87. Bottom panel 82 is disposed between lower vertical portions 87 of side panels 83.

In an alternative method of the invention, discrete panel elements are joined to form housing 62. By this method, the panel elements are individually adjustable to conform to the shape of the joined trough section 61 and end plates 63. This method is best utilized when one or more internal support gussets 92 are incorporated into housing 62, providing trough element 61 optimal structural strength and support. First and second side panels 83 are formed by deforming linearly extending flat plates in much the same manner described above. A lower, inwardly extending flange member 89 may also be formed by deforming the lower end of vertical portions 87. Bottom panel 82 is formed by deforming opposing lengths of a linearly extending flat plate to form downwardly extending flange members 91 normal the surface of the bottom panel 82. Bottom panel 82 may then be disposed between opposing vertical portions 87 with downwardly extending flange members 91 slidably adjustable relative vertical portions 87.

The step of aligning and sealingly joining housing 62 with joined trough section 61 and end plates 63 will vary depending upon whether housing 62 is formed as a unitary element or is made with discrete elements. When housing 62 is formed as a unitary element, any internal support gussets 92 must be attached to internal walls of housing 62 in a blind fashion. That is, gussets 92 are positioned within housing 62, optimally aligned normal side panels 83 and normal bottom panel 82, and then attached thereto. This may introduce undesirable deforming forces on trough section 61 resulting from either misalignment of housing 62 or a lack of suitable supporting contact of gussets 92 with trough section lower surface 70. Trough section 61 is positioned within housing 62 such that trough section flange members 67 rest upon side panel inwardly extending flanges 84. Housing 62 is aligned relative trough section 61 and inner faces of end plates 63. Housing 62 is then sealingly attached to trough section flanges 67 by welding, bolting, riveting or similar means appropriate to the materials selected for forming trough element 60. After attachment of housing 62 to first and second flange members 67, end edges of housing 62 are then sealingly joined to inner faces of end plates 63.

When housing 62 is formed with discrete elements, side panels 83 are temporarily held in mating alignment relative trough section 61. Internal support gussets 92 may then be positioned for optimum support of trough section 61 as described above, however, because gussets 92 are still accessible, more perfect alignment is achievable since gussets 92 may be positively positioned in mating contact with lower trough surface 70. After gussets 92 are positively positioned as described, they may then be attached to side panels 83. Bottom panel 82 may then be positioned with its downwardly extending flange members mating with side panel vertical portions 87. Because bottom panel 82 is adjustable relative vertical portions 87 its upper surface may be positively mated with gusset base elements 94. Bottom panel 82 may then be attached to side panels 83. Trough section 61 may be removed to permit permanent attachment of gusset base elements 94 to bottom panel 82, resulting in a stronger trough element 60. Trough section 61 may then be positioned within housing 62, aligned and sealingly attached as described for the method involving a unitary housing.

What I claim is:

1. In a conveyor system having a driven roller and at least one idler roller with an endless belt entrained about said driven and idler rollers, the improvement comprising a fluid plenum trough element comprising:

a. a longitudinally extending trough section supporting a portion of said endless belt, said trough section having an arcuate, constant radius, transverse dimension extending symmetrically upward from each side of a vertical centerline of said trough, and first and second laterally extending flanges extending substantially horizontally from said constant radius section, said belt supported within said constant radius dimension, b. a pair of arcuate end plates including an arcuate constant radius upper flange affixed near opposite ends of said trough section, c. a housing conforming to said trough section and sealingly joined thereto, and said housing sealingly joined to said end plates, to define a plenum therein, and d. a plurality of orifices arrayed longitudinally along said vertical centerline of said trough, said orifices providing fluid communication between said plenum and an upper surface of said trough.

2. The improvement of claim 1, said end plates further comprising an upper arcuate edge, a. said arcuate edge precisely matching said arcuate constant radius transverse dimension of said trough with said arcuate edge affixed to said trough section at the ends thereof.

3. The improvement of claim 2, said end plates further comprising a base element, first and second opposed vertical support elements, and a central rib, a. said vertical support elements extending upwardly from opposing ends of said base element and joining ends of said upper arcuate edge, b. said central rib joining midpoints of said base element and said upper arcuate edge, said upper arcuate edge, vertical support elements, base element, and central rib defining a pair of contoured low restriction fluid passages, c. said end plates attached to a lower surface of said trough section, along lines parallel end edges of said trough section, said parallel lines offset from said end edges by a distance not exceeding the thickness of said end plates.

4. The improvement of claim 3, wherein said end plates further comprise integral extensions on said base and vertical support elements extending outwardly beyond outer walls of said housing, and a plurality of holes are disposed along said extensions.

5. The improvement of claim 4, wherein said plurality of holes receive attachment means for joining a sealing plate, said sealing plate sealingly closing an end of said fluid plenum element.

6. The improvement of claim 5, further comprising a gasket compressed between said end plate and said sealing plate.

7. The improvement of claim 4, wherein said plurality of holes receive attachment means for joining an end plate of a subsequent fluid plenum element.

8. The improvement of claim 7, further comprising a gasket compressed between said end plate and said subsequent fluid plenum element.

9. The improvement of claim 1, said housing comprising a unitary element comprising a bottom panel, and first and second opposed side panels,
   a. said bottom panel disposed between said first and second side panels, and
   b. said housing having a predetermined length corresponding to a known distance between inner faces of said end plates.

10. The improvement of claim 9, said first and second side panels further comprising an upper inwardly extending flange member.

11. The improvement of claim 10, said first and second side panels further comprising a lower vertical portion, and an intermediate section joining said upper flange member and said lower vertical portion.

12. The improvement of claim 1, said housing comprising discrete elements comprising a bottom panel, and first and second opposed side panels,
   a. said bottom panel disposed between lower vertical portions of said first and second side panels, and
   b. said housing having a predetermined length corresponding to a known distance between inner faces of said end plates.

13. The improvement of claim 12, said first and second side panels further comprising an upper inwardly extending flange member.

14. The improvement of claim 13, said first and second side panels further comprising, a lower vertical portion, a lower inwardly extending flange member, and an intermediate section joining said upper flange member and said lower vertical portion,
   a. said lower inwardly extending flange member extending substantially horizontally along a length of said side panel lower vertical portion, and
   b. said bottom panel comprising a pair of vertical flanges extending downwardly along opposing longitudinal lengths of said bottom panel, said vertical flanges slidably adjustable relative said lower vertical portions.

15. The improvement of claim 1, further comprising at least one internal support gusset, said gussets attached to internal walls of said housing, said gussets mating with and supporting a lower surface of said trough section.

16. The improvement of claim 1, said support gussets further comprising a base element, first and second vertical support elements, a central rib, and an upper arcuate edge;
   a. said arcuate edge precisely matching said arcuate constant radius transverse dimension of said trough;
   b. said vertical support elements extending upwardly from opposing ends of said base element and joining opposing ends of said upper arcuate edge;
   c. said central rib joining midpoints of said base element and said upper arcuate edge;
   d. said upper arcuate edge, vertical support elements, base element, and central rib defining a pair of contoured low restriction fluid passages; and
   e. said base element and vertical support members attached to internal walls of said housing.

17. The improvement of claim 1, wherein said trough further comprises a belt float regulating wedge positioned at a point on said constant radius section slightly higher than lateral edges of said belt, said regulating wedge comprising an inner face, an outer face, and a tapered leading edge;
   a. said inner face shaped to conform to the radius of said trough;
   b. said outer face comprising a taper from a thickened top edge of said wedge to a near zero thickness at a bottom edge of said wedge;
   c. said leading tapered edge tapering from a near zero thickness beginning in a direction downstream a translational path of said entrained belt, to a thickened center of said wedge; and
   d. said leading tapered edge cooperating with said bottom tapered edge to slidably engage said belt, said engagement progressively expanding a gap between said belt and said trough surface, said expanding gap venting excess pressurized fluid.

18. The improvement of claim 17, wherein said regulating wedge further comprises, a second tapered edge;
   a. said second tapered edge tapering from a near zero thickness from a point upstream said translational path of said belt to said thickened center of said wedge; and
   b. said first or second tapered edge selectively cooperating with said bottom tapered edge to slidably engage said belt.

19. The improvement of claim 1, further comprising a cover affixed to said trough first and second flanges.

20. The improvement of claim 19, wherein said cover is convex and is sealingly affixed to said trough first and second flanges.

21. In a conveyor system having a driven roller and at least one idler roller with an endless belt entrained about said driven and idler rollers, the improvement comprising a fluid plenum trough element comprising:
   a. a longitudinally extending trough section intermediate said rollers, said trough section having an arcuate, transverse portion extending symmetrically upward from each side of a vertical centerline of said trough from one end of said element to a second end of said element, said belt partially overlying said arcuate portion;
   b. an end plate including an arcuate upper flange affixed at each end of said trough section, said end plate reinforcing and maintaining said trough intermediate each end for precise matching of a second trough element to said trough element;
   c. a housing conforming to said trough section and sealingly joined thereto, and said housing sealingly joined to said end plates, to define a plenum therein; and
   d. a plurality of orifices arrayed longitudinally along said vertical centerline of said trough, said orifices providing fluid communication between said plenum and an upper surface of said trough beneath said belt.

22. The improvement of claim 21, said end plates further comprising an upper arcuate edge,
   a. said arcuate edge precisely matching said arcuate transverse portion of said trough with said arcuate edge affixed to said trough section at the ends thereof.

23. The improvement of claim 22, said end plates further comprising a base element, first and second opposed vertical support elements, and a central rib:

a. said vertical support elements extending upwardly from opposing ends of said base element and joining ends of said upper arcuate edge;
   b. said central rib joining midpoints of said base element and said upper arcuate edge, said upper arcuate edge, vertical support elements, base element, and central rib defining a pair of contoured low restriction fluid passages;
   c. said end plates attached to a lower surface of said trough section, along lines parallel end edges of said trough section, said parallel lines offset from said end edges by a distance not exceeding the thickness of said end plates.

24. The improvement of claim 23, wherein said end plates further comprise integral extensions on said base and vertical support elements extending outwardly beyond outer walls of said housing, and a plurality of holes are disposed along said extensions.

25. The improvement of claim 24, wherein said plurality of holes receive attachment means for joining a sealing plate, said sealing plate sealingly closing an end of said fluid plenum element.

26. The improvement of claim 25, further comprising a gasket compressed between said end plate and said sealing plate.

27. The improvement of claim 24, wherein said plurality of holes receive attachment means for joining an end plate of a subsequent fluid plenum element.

28. The improvement of claim 27, further comprising a gasket compressed between said end plate and said subsequent fluid plenum element.

* * * * *